United States Patent [19]

Pritchard

[11] 4,096,516
[45] Jun. 20, 1978

[54] ELECTRONIC SIGNAL PROCESSING APPARATUS

[75] Inventor: Dalton Harold Pritchard, Princeton, N.J.

[73] Assignee: RCA Corporation, New York, N.Y.

[21] Appl. No.: 781,303

[22] Filed: Mar. 25, 1977

[51] Int. Cl.² ............................................. H04N 9/535
[52] U.S. Cl. ......................................... 358/31; 358/37
[58] Field of Search ..................................... 358/31, 37

[56] References Cited

U.S. PATENT DOCUMENTS

| 3,969,757 | 7/1976 | Amery | 358/31 X |
| 3,996,610 | 12/1976 | Kawamoto | 358/31 |

Primary Examiner—Robert L. Richardson
Attorney, Agent, or Firm—Eugene M. Whitacre; Kenneth R. Schaefer; Ronald H. Kurdyla

[57] ABSTRACT

A charge coupled device (CCD) comb filter arrangement is provided which is particularly suited for separating luminance and chrominance signal components in a color television signal. Parallel paths of long and short CCD delay lines using a common clock drive are provided in which the difference in delay between the long and short lines determines the frequency intervals between the teeth of the comb substantially independently of factors other than the clock frequency and the number of delay stages. In an embodiment suitable for processing standard NTSC broadcast signals, a clock frequency of three times the color subcarrier frequency is employed in combination with a long, two phase delay line of 683½ stages and two short delay lines of one stage each to provide the desired 1-H combs for luminance and chrominance. Vertical detail information is recovered from the chrominance comb and is reinserted as desired into the luminance signal.

13 Claims, 1 Drawing Figure

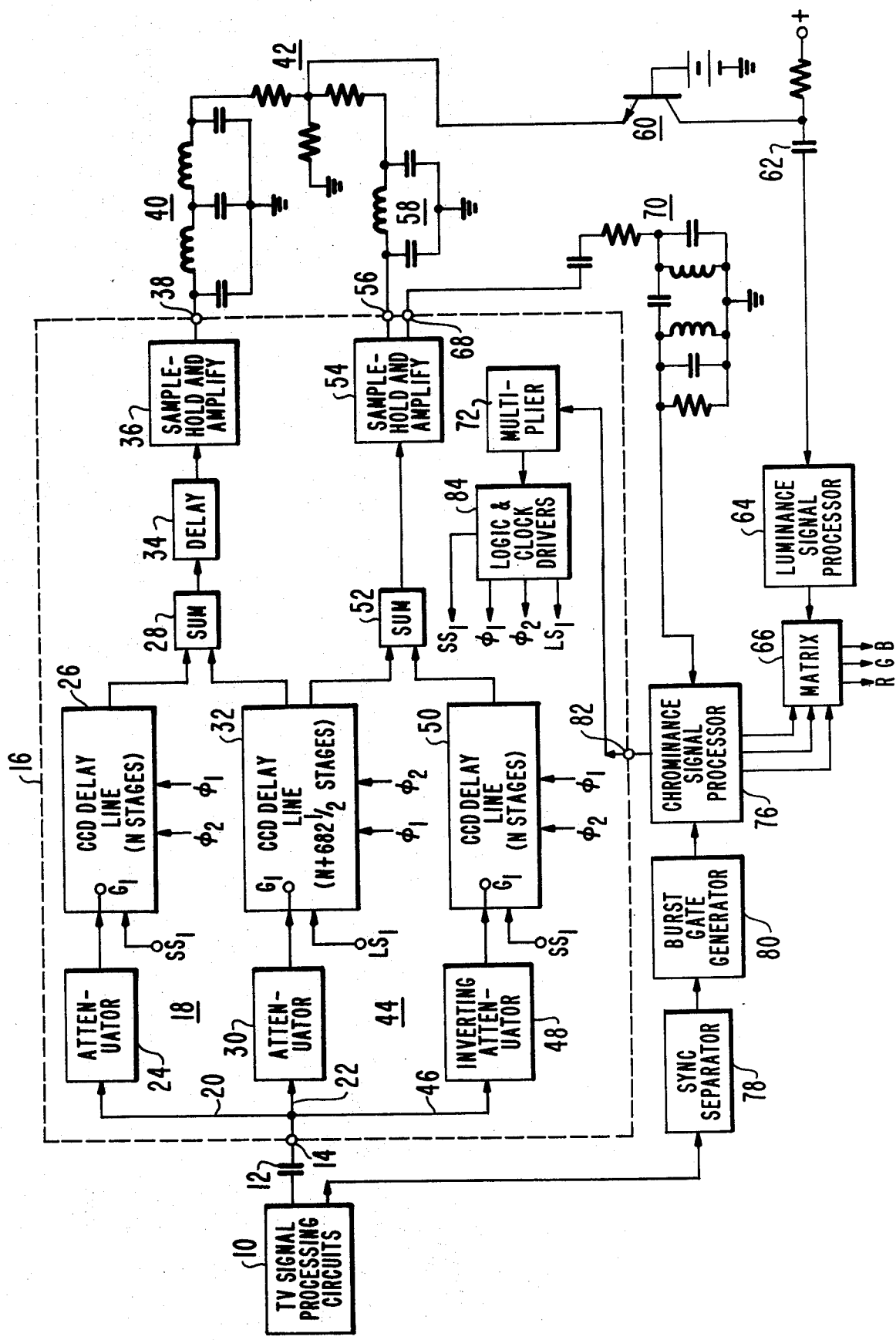

ELECTRONIC SIGNAL PROCESSING APPARATUS

This invention relates to circuit arrangements for processing periodic electrical signals and, in particular, to arrangements for processing color television signals so as to provide comb filtering, detail enhancement, combinations of comb filtering and detail enhancement or other similar functions.

Electronic signals which are periodic in nature may be processed advantageously by storing replicas of the signal which are separated in time by the repetition period and then combining the stored replicas to enhance information content of the signal. For example, conventional television broadcast systems (and most video record/playback systems) are arranged so that much of the brightness (luminance) information contained in an image is represented by signal frequencies which are concentrated about integral multiples of the horizontal line scanning frequency. Color (chrominance) information is encoded or inserted in a portion of the luminance signal spectrum around frequencies which lie halfway between the multiples of line scanning frequency (i.e., at odd multiples of one-half the line scanning frequency).

Chrominance and luminance information can be separated and detail information may be enhanced by appropriately combing the composite signal spectrum. Known combing arrangements take advantage of the fact that the odd multiple relationship between chrominance signal components and half the line scanning frequency causes the chrominance signal components for corresponding image areas on successive lines to be 180° out of phase with each other (so-called interlaced frequency components). Luminance signal components for corresponding image areas on successive lines are substantially in phase with each other (and comprise non-interlaced components).

In a comb filter system, one or more replicas of the composite image-representative signal are produced which are time delayed from each other by at least one line scanning interval (a so-called 1-H delay). The signals from one line are added to signals from a preceding line, resulting in the cancellation of the interlaced frequency components (e.g., chrominance) while reinforcing the non-interlaced frequency components (e.g., luminance). By subtracting the signals for two successive lines (e.g., by inverting the signals for one line and then adding the two), the non-interlaced frequency components are cancelled while the interlaced frequency components are reinforced. Thus, the luminance and chrominance signals may be mutually combed and thereby may be separated advantageously. Numerous arrangements have been proposed for comb filtering systems, as well as for vertical aperture correction systems which also employ one or more 1-H delay devices (see, for example, U.S. Pat. Nos. 2,729,698 — Fredendall; 2,885,573 — Fredendall; 2,957,042 — Gibson and Schroeder; 2,971,053 — Gibson; 3,030,440 — Schade; 3,546,372 — Dischert, Brooks and Cosgrove; 3,546,490 — Sangster; 3,996,606 — Pritchard and 3,996,610 — Kawamoto).

It is customary to illustrate systems of the types noted above in a simplified form with one direct, undelayed signal path shown as a simple wire and a second delayed signal path including the 1-H delay device, each of the signal paths being coupled to a respective input of a signal adder or subtracter circuit. In actual systems, however, the delayed signal path customarily includes an additional adjustable delay element for matching signal delays which are introduced in the "undelayed" path by practical circuit elements such as amplifiers and the input circuits of the signal adding or subtracting devices themselves. It is also difficult, in a number of the known types of 1-H delay systems, to accurately predict or control the delay of the 1-H device itself, thereby requiring an adjustable trimming delay device in either or both paths for this reason as well.

Where the delay device requires time sampling of the signal to be delayed, a filter is often required in the delayed path to remove the sampling waveform. The filter itself will introduce a delay and some modification of the amplitude response of the delayed signal, each of which factors may require the addition of adjustable compensating elements within the comb filter apparatus.

Thermal characteristics as well as environmental conditions affecting the delay devices and the associated circuits also generally must be taken into account when designing a comb filter or like apparatus.

In accordance with one aspect of the present invention, apparatus for processing electrical signals comprises means for supplying an input signal containing at least a first information component, at least a portion of the frequency spectrum of the information component being characterized by signal energy concentrated in the vicinity of each of a plurality of frequencies spaced apart by a difference which is equal to a first frequency. Means are also provided for supplying clock signals at a frequency which is proportional to the first frequency. At least first and second signal processing paths are provided, each having a signal input port coupled to the input signal supplying means and a delayed signal output port. The first and second paths include unequal numbers of signal delaying stages. The signal delaying stages are responsive to the clock signals for transferring signals representative of the input signal between the input and output ports. The first and second paths produce a difference in time delay which is inversely proportional to the clock signal frequency and is directly proportional to the difference in the number of stages in the two paths. Signal combining means are coupled to the delayed signal output ports of each of the paths for producing a combined signal having a comb type frequency spectrum with periodic relative maximum signal content spaced apart by the first frequency. Filtering means are coupled to the output of the signal combining means for passing a band of frequencies including those associated with the first information component.

In a particular embodiment of the invention, the input signals are composite color television signals in which luminance and chrominance information components are included. The high frequency portion of the luminance information includes a frequency spectrum which is periodic with respect to frequency and includes maxima spaced apart by the horizontal line scanning frequency. Chrominance information is interleaved between the luminance signal maxima in the high frequency portion of the band.

Luminance, chrominance and low frequency vertical detail information are separated by comb filtering followed by appropriate band selection filtering.

Referring to the drawing, a portion of a color television receiver is illustrated which is suitable for processing signals arranged in the NTSC or standard U.S. broadcast format. Portions of the apparatus which are described as conventional but are not otherwise described may be constructed in the manner shown in RCA Color Television Service Data 1976, No. C-6 published by RCA Corporation, Indianapolis, Ind.

Composite color television video signals including luminance and chrominance signal components are provided by TV signal processing circuits 10 which include, for example, conventional radio frequency and intermediate frequency amplifier stages and a video detector. The luminance and chrominance signal components, which are frequency interlaced in the manner noted above, are coupled via a capacitor 12 to a terminal 14 of a signal processing arrangement 16 enclosed by a dashed line. The dashed line includes circuit components which all may be fabricated on a single monolithic integrated circuit of the N-MOS type.

The composite video signals are coupled from terminal 14 to a luminance signal comb filter 18 having first and second signal paths 20, 22. Signal paths 20 and 22 are arranged to exhibit a nominal difference in signal delay equal to one horizontal line scanning period (1-H delay). Signal path 20 includes an attenuator or fractional gain amplifier 24, a signal delay line 26 and one input port of a signal summing device 28. Delay line 26 is operative to delay signals in the baseband or video frequency range (e.g., 0 to the vicinity of 5 Megahertz) by a relatively short time interval (e.g., a small fraction of a 1-H time period). Signal path 22, like path 20, includes an attenuator or fractional gain amplifier 30, a baseband signal delay device 32 operative to delay signals by a predetermined time interval (greater than that of delay line 26 by an interval equal to 1-H) and a second input port of signal summing device 28. Combed signals are coupled from the output of summing device 28 to a filter compensating delay unit 34, the output of which is coupled in turn to a sample and hold detector-amplifier 36. Output signals are coupled from sample and hold circuit 36 via a terminal 38 to a low pass filter 40. A resultant combed luminance signal output from low pass filter 40 is coupled to a signal combining matrix 42 (shown illustratively as a resistor matrix) for combination with a vertical detail signal as will appear below.

The composite video signals provided at terminal 14 are also coupled to a chrominance signal comb filter 44 which shares a portion of the signal path 22 and, in addition, includes a further signal path 46 and additional components as will be noted below. The two signal paths associated with chrominance comb filter 44, like those of luminance comb filter 18, are arranged to exhibit a difference in signal delay equal to one line scanning period. Signal path 46 includes an inverting fractional gain amplifier or attenuator 48, a signal delay line 50 substantially identical to delay line 26 and one input port of a signal summing device 52. A second input port of summing device 52 is coupled to a second output from delay line 32. Substantially identical signals are provided at the two outputs of delay line 32.

Combed signals are coupled from the output of summing device 52 to a sample and hold detector-amplifier 54 similar to sample and hold circuit 36.

A first output is coupled from sample and hold circuit 54 via a terminal 56 to a low pass filter 58, the filter 58 having an amplitude versus frequency response characteristic suitable for passing relatively low frequency vertical detail information (e.g., a pass band of 0 to 1.5 MHz) while rejecting relatively higher frequency chrominance information contained in the output from sample and hold circuit 54. The vertical detail information is combined in matrix 42 with the combed luminance information provided from sample and hold circuit 36 and low pass filter 40. The resulting combed luminance signal, including vertical detail information, is coupled via a common base transistor amplifier 60 and a coupling capacitor 62 to a luminance signal processing circuit 64 which may be of conventional form. Amplified and appropriately gain controlled luminance signals are coupled from processor 64 to a matrix circuit 66 for combination with color difference signals which are derived in a manner explained below.

A second output is provided from sample and hold circuit 54 via a terminal 68 to a bandpass filter 70 arranged to pass chrominance signal components while rejecting frequencies outside of the chrominance signal band. Combed chrominance signal components are coupled via filter 70 to a chrominance signal processor 76 which may be of known form. Chrominance signal processor 76 is also supplied with a color burst gating signal in a known manner by means of a sync separator 78 and a burst gate generator 80, the separator 78 being coupled to TV signal processing circuits 10 in a known manner.

Chrominance signal processor 76 includes a conventional chrominance subcarrier oscillator (not shown) which is synchronized, for example, by means of the synchronizing burst included in the received composite signal. The color subcarrier oscillator signal and the combed chrominance signal components are appropriately mixed in chrominance signal processor 76 to produce suitable color difference signals (e.g., R-Y, G-Y, B-Y).

In addition, the color subcarrier oscillator signal (conventionally referred to as 3.58 MHz in a receiver operating under U.S. standards) is supplied via a terminal 82 to a color subcarrier multiplier (tripler) circuit 72 contained within signal processing arrangement 16. Color subcarrier multiplier 72 may, for example, be of the phase locked loop variety and is arranged to provide output signals having a fundamental frequency three times that of the relatively accurate and stable subcarrier oscillator signal provided by chrominance signal processor 76. The output from multiplier 72 is coupled to logic and clock driver circuits 84 which are arranged to provide properly timed "strobe" pulses and clock signals. The clock signals ($\phi_1$ and $\phi_2$) are oppositely phased, 50% duty cycle, relatively square waves and will be referred to for convenience as 10.7 MHz clock signals (although their frequency is actually three times 3.579545 MHz or 10.738635 MHz in the preferred arrangement). These clock signals are suitable for effecting transfer of charge between stages of a charge transfer device type of delay line.

In the illustrated embodiment of the invention, each of the delay lines 26, 32, 58 is a charge coupled device (CCD) type of the more general class of charge transfer devices and is preferably fabricated using a buried channel structure. One suitable two-phase gate electrode structure which may be employed is the type in which the gates are formed using polysilicon material in two separate, isolated levels in a manner shown, for example, in U.S. patent application Ser. No. 758,184 filed Jan. 10, 1977 in the names of James E. Carnes, Donald J. Sauer and Peter A. Levine. Furthermore, such devices preferably are arranged to use the Carnes et al. version of the "fill and spill" technique of transferring charge into the input well of each delay line, the fundamental approach being described in U.S. Pat. No. 3,986,198 granted to Walter F. Kosonocky. The Kosonocky technique as well as additional information regarding construction and operation of charge transfer delay lines, is also described in a textbook entitled "Charge Transfer Devices" by C. H. Sequin and M. F. Tompsett, published in 1975 by Academic Press, Inc., New York, N.Y. Suitable arrangments for deriving output signals from the delay lines are also described in this text, a particularly advantageous arrangement being the floating diffusion output amplifier shown therein.

The delay lines 26, 32, 50 preferably also make use of techniques for transferring charge and introducing signals which are set forth in U.S. patent application Ser. No. 708,397 filed July 26, 1976, in the names of Donald J. Sauer and Peter A. Levine.

It is necessary to properly time the initial transfer of each packet of charge into the first signal well of each delay line with respect to the subsequent transfer of signal-representative charge to subsequent stages in response to the clock signals $\phi_1$ and $\phi_2$. In order to properly time this sequence of events, the logic and clock driver circuit 84 is arranged to provide strobe or pulse signals $LS_1$ and $SS_1$ in timed relation with the clock signals for application, respectively, to the long delay line 32 and the short delay lines 26 and 50.

In the illustrated embodiment, the short delay lines 26, 50 are shown as including equal numbers of stages (N) while the long delay line 32 includes a greater number of stages (N + 682 ½). The number N may be selected equal to unity and the operation of the apparatus will be described for that condition. The difference in delay between the long line 32 and each of the short lines 26, 50 is determined by the clock frequency (three times 3.579545 MHz) and the difference in the number of stages (682 ½). Thus, in the illustrated arrangement, the difference in delay between the long and short lines will be 682.5/(3) (3.579545 MHz) or 63.555 microseconds (a 1-H delay). The need for a half stage of delay in one of the lines is related to the choice of the clock frequency. The frequency of three times the color subcarrier is chosen first, to comply with the Nyquist criterion related to sampled data systems which requires that a sampling rate must be at least twice the highest frequency which is to be sampled and secondly, to provide the desired stability of the clock signals without undue complication of the clock generation circuits. It should be noted that the color subcarrier frequency, itself, is an odd multiple of one-half the line scanning frequency (i.e., $f_{SC} = f_H \times 455/2$). The clock frequency is thus seen to be also proportional to the line scanning frequency.

In the operation of the apparatus shown in the FIGURE, the subcarrier oscillator included within chrominance signal processor 76 (typically a crystal controlled oscillator) provides the desired 3.58 MHz subcarrier signal to color subcarrier multiplier 72 via terminal 82. The 10.7 MHz clock waveforms $\phi_1$ and $\phi_2$ are derived from the multiplied subcarrier within logic and clock driver circuits 84. The charge preset pulses $LS_1$ and $SS_1$ are derived from the clock waveforms and are applied, respectively, to the input source diffusion or $S_1$ electrode (not shown) of long delay line 32 and short delay lines 26, 50. These charge preset pulses together with the clock pulses produce the desired initial transfer of charge in the delay lines in the manner described in the above-noted Kosonocky patent, Sauer and Levine and Carnes, Sauer and Levine applications. The pulse $LS_1$, which is applied to long delay line 32, is timed so that charge is injected prior to each "on" or charge transfer half-cycle of the $\phi_1$ clock waveform. The pulse $SS_1$, which is applied to short delay lines 26 and 50, is timed so that charge is injected prior to each "on" or charge transfer half-cycle of the $\phi_2$ clock waveform. It should be noted that, in the FIGURE, the clock signals supplied to long delay line 32 are labelled $\phi_1$, $\phi_2$ reading from left to right while the clock signals supplied to short delay lines 26 and 50 are labelled $\phi_2$, $\phi_1$ reading from left to right. This is intended to indicate diagrammatically that in the long delay line 32 the $\phi_1$ clock waveform is applied to the first half of each charge transfer stage while the $\phi_2$ clock waveform is applied to the second half of each stage. In the short delay lines 26, 50, the $\phi_2$ clock waveform is applied to the first half of each charge transfer stage while the $\phi_1$ clock waveform is applied to the second half of each stage. This difference in the manner in which the video signal is sampled at the inputs of the long and short delay lines is related to the fact that one of the delay lines (32) includes a half stage. The reason for having this half stage, as was pointed out earlier, is related to the particular selection of the clock frequency equal to three times the color subcarrier frequency. In that case, the half stage is required to provide the desired 1-H delay difference. The combination of one of the delay lines including a half stage and the long and short delay lines being clocked, in effect, in opposite time sequences makes it possible to transfer charge out of each of the delay lines 26, 32, 50 during the same charge transfer half cycle (e.g., the charge transfer half cycle of the $\phi_2$ clock waveform). The two input signals supplied to each of summing circuits 28 and 52 are therefore applied in time coincidence.

Each of the delay lines 26, 32, 50 is also supplied at its terminal $G_1$ with the full bandwidth luminance signal (including fine detail information in the vicinity of 4 MHz) and the full bandwidth chrominance signal which is interleaved with the luminance signal in a frequency band between approximately 2 MHz and 4 MHz. Attenuators 24, 30 and inverting attenuator 48 are arranged to exhibit a relatively wide bandwidth in order to accommodate such signals substantially without altering their characteristics. Wide bandwidth signal coupling circuits within processor 16 preferably also include conventional D.C. restorers (not shown) for clamping the sync tips of the video signal to a predetermined level in order to conserve the dynamic range of the stages of the delay lines and associated circuits. It should be noted that inverter 48 may be expected to provide a slightly different delay than that associated with attenuators 24 and 30. It has been determined that, using NMOS amplifiers, which are readily constructed in integrated form, such differences in delay can be maintained at less than five nanoseconds, a value which has been found to be sufficiently small compared to 1-H (63.555 microseconds) to avoid deterioration of the desired combing of the chrominance signals.

The output of each of the delay lines 26, 32, 50 is a sampled data signal which is switched at the clock frequency between a reference level and a video signal-representative level. Such a sampled data signal includes a clock frequency component (and its harmonics), baseband image-representative signal components and sideband components which are related to the image signal components and are spaced above and below the clock frequency components and its harmonics.

The sampled data signals from short delay line 26 and long delay 32, which are representative of image information from two successive lines, are added together in summing circuit 28. The non-interlaced frequency components (e.g., luminance components) reinforce each other while the interlaced frequency components (e.g., chrominance components) are of polarities to cancel each other. The summing circuit 28, which should exhibit a greater bandwidth than the luminance/chrominance signal range in order to maintain the desired close matching of delays, provides a combed luminance signal at its output which includes additional high frequency components at, above and below the clock frequency. These high frequency components are removed by filter circuit 40. The degree of cancellation of the interlaced components at the output of comb filter 18 is dependent principally upon the accuracy of the 1-H difference in delay between the two paths 20, 22 extending from the common input terminal 14 to the summing circuit 28. As noted earlier, since the two paths are substantially identical except for the difference in the number of CCD transfer stages (i.e., 682 ½ stages), the difference in delay is determined by this difference in number of stages and the clock signal frequency. The number of stages is fixed by the physical structure. The clock frequency is determined by the color subcarrier oscillator frequency. The color subcarrier oscillator frequency is highly accurate and is locked itself to the interlaced reference color burst component which accompanies the received chrominance signal. The difference in delay between the two paths is therefore accurately set and maintained by the subcarrier oscillator. The two signal paths of luminance comb filter 18, up to and including the summing circuit 28, do not include lumped frequency selective filter elements which might affect the phase or amplitude response of either path in the luminance or chrominance signal frequency ranges. The low pass filter 40, associated with luminance comb filter 18 for filtering out the clock signal and its sideband components, is outside the comb filter itself and follows the summing circuit 28. Filter 40 therefore does not adversely affect the time delay or amplitude characteristics of the luminance comb filter 18. The filter 40 need not match filter characteristics associated with other circuits in the system. Adjustable delays need not be incorporated in either the long delay path associated with delay line 32 or the short delay path associated with delay line 26. The incremental delay device 34, which may be a two stage CCD line having a delay of substantially 186 nanoseconds (each stage of each line provides a 93 nanosecond delay when clocked at 10.7 MHz) is included following the comb filter 18 to equalize the delay of the combed luminance signal with respect to a vertical detail luminance component which is passed through the relatively narrow band low pass filter 58 as will be described subsequently.

The degree of cancellation of the interlaced signal components at the output of summing circuit 28 is also dependent upon the relative attenuations or gains of the long and short delay paths. The charge transfer efficiency of buried channel CCP's may be made sufficiently high that the attenuations of the long and short delay lines 32, 26 are sufficiently closely matched to provide a ratio between the desired and undesired frequency components in each of the comb filters of the order of 30 db. If deeper combing "nulls" are desired, appropriate D.C. controlled gain adjustment apparatus may be added in each signal path (for example, in circuit with the attenuators 24, 30 as well as with the inverting attenuator 48). Such "trimming" circuits should also maintain the desired wide bandwidth so as not to adversely affect the accuracy of the 1-H difference in delay.

The combed luminance signal output of summing circuit 28 is substantially free of chrominance signal components. Therefore, an image reproduced from such a luminance signal will be free of the "dot-crawl" effects in large color areas and along vertical edges which are encountered in conventional non-combed television signal processing systems which do not include band limiting of the high frequency portion of the luminance signals. Furthermore, the high frequency luminance information (in the vicinity of 2 to 4 MHz) at the output of summing circuit 28 may be emphasized or peaked without producing such undesired color "dot-crawl" interference effects.

The sampled data signals from long delay line 32 and short delay line 50 (the latter having been supplied with inverted video signals) are added together in the wide bandwidth summing circuit 52. The non-interlaced frequency components (e.g., the luminance signal components which are grouped around the harmonics of the line scanning frequency) which are supplied by delay lines 32 and 50 are effectively subtracted from each other by virtue of the presence in path 46 of inverting attenuator 48. These non-interlaced components from successive lines tend to cancel at summing circuit 52. The remaining signal components which appear at the output of summing circuit 52 include the interlaced chrominance signal components and vertical detail information which falls between the line frequency harmonics in the range of 0 to 1 MHz. In addition, as was the case with luminance comb filter 18, clock frequency components and sidebands about such components are present at the output of summing circuit 52.

Low pass filter 58 is arranged to separate the low frequency vertical detail information from the chrominance information (and remaining clock frequency related signals). Band pass filter 70 selects the chrominance information while excluding vertical detail and clock frequency related signals. The filters 58 and 70, of course, do not affect the combing action of delay lines 32 and 50. Low pass filter 58 has a narrower frequency response than the low pass filter 40 associated with the main combed luminance output. Delay element 34 is arranged to delay the main luminance signal (after it is combed) so as to place the two inputs to matrix 42 in time coincidence.

The low frequency vertical detail information therefore is added to the appropriately delayed remainder of the luminance signal information at matrix 42. The matrix 42 may include a variable attenuation and/or amplification stage when it is desired to permit selection of the degree of vertical detail or peaking which is included in the resultant luminance signal output of matrix 42. The full luminance signal is applied in a conventional manner to luminance processor 64 and ultimately to a display device. It should be kept in mind that the luminance signal produced in this manner includes substantially higher frequency components than are commonly encountered in commerical television receivers (e.g., in the range of 3 to 4 MHz). The luminance processing stage should therefore be of sufficient bandwidth to realize the desired effect of increased luminance resolution in the displayed image.

The full bandwidth combed chrominance signal provided at the output of filter 70 is processed in a conventional manner in chrominance signal processor 76 to provide color difference signals which are substantially free of "cross color" interference normally encountered when luminance signal information is present in the color channel in the vicinity of the chrominance subcarrier frequency.

Matrix 66 serves to combine the relatively interference-free color difference signals with the wide bandwidth, relatively interference-free luminance signals to provide three color signals (R, G, B) for application to an associated display device.

The sample-hold and amplify apparatus 36 and 54 shown in the FIGURE is not essential to the operation of the invention but offers the advantages of reducing the clock frequency components in the signals prior to bringing such signals out of the terminals 38, 56, 68. Furthermore, such sample and hold apparatus (which samples the 50% duty cycle wave described above at the clock frequency) has the effect of doubling the level of the output video signals as compared to a simple, passive low pass filter. The sample and hold circuits 36, 54 may be keyed by sampling pulses derived from the clock waveforms in a conventional manner.

While the invention has been described in the context of a preferred arrangement for processing color television signals of the NTSC type in a color television receiver, it will be readily apparent from this description to persons skilled in the art of signal processing that the invention may also find application in the processing of other types of signals in general and, in particular, in the processing of color television signals formed in accordance with different standards for use in receivers or other recording, reproducing or transmission apparatus.

Furthermore, various modifications may be made to the illustrated apparatus without departing from the scope of the invention. For example, wide bandwidth gain controlling or signal attenuating apparatus may be included in one or more of the signal paths associated with delay lines 26, 32 and 50 either before or after the delay lines. Such amplitude controlling apparatus may be adjusted to control the relative amplitudes of signals in the various paths so as to improve the cancellation of unwanted frequency components or to enhance the transmission of desired frequency components. A variable gain amplifier may be included in or prior to matrix circuit 42 to permit adjustment of the amplitude of the vertical detail signal (vertical peaking) or to selectively amplify certain frequency components of the combed luminance signal. In either case, the latter apparatus has no effect upon the combing action of the system, since such combing is performed prior to such controls. These and other such modifications are considered to be within the scope of the invention described.

What is claimed is:

1. Apparatus for processing electrical signals comprising:
   means for supplying an input signal containing at least a first information component, at least a portion of the frequency spectrum of said component being characterized by signal energy concentrated in the vicinity of each of a plurality of frequencies spaced apart by a difference which is equal to a first frequency;
   clock signal generating means for supplying clock signals at a frequency proportional to said first frequency;
   at least first and second signal processing paths, each having a signal input port coupled to said input signal supplying means and a delayed signal output port, said first and second paths including unequal numbers of signal delaying stages coupled to said clock signal generating means and responsive to said clock signals for transferring signals representative of said input signal between said input and said output ports, said first and second paths providing a difference in time delay of said input signal which is inversely proportional to said clock signal frequency and is directly proportional to the difference in the number of stages in said paths;
   signal combining means coupled to said delayed signal output ports of each of said paths for combining signals delayed by different time intervals to produce at least one combined signal having a comb type frequency spectrum with relative signal maximums spaced apart by said first frequency; and
   filtering means coupled to said signal combining means for passing a band of frequencies including those associated with said first information component.

2. Apparatus in accordance with claim 1, wherein:
   each of said signal delaying stages is of the charge transfer device type and said signals transferred between said input and output ports are in the form of electrical charge representative of said input signal.

3. Apparatus in accordance with claim 1, wherein:
   said input signal further includes a second information component, the frequency spectrum of said second component being characterized by signal energy interleaved with that of said first component but concentrated in the vicinity of each of a plurality of frequencies substantially midway between said frequencies of said plurality associated with said first component;
   said apparatus further comprising at least a third signal processing path having a like number of stages as said first path coupled to said clock generating means, an input port coupled to said signal supplying means, a delayed signal output port and means for inverting signals supplied by said signal supplying means; and
   said signal combining means also being coupled to said delayed signal output port of said third path for combining delayed signals provided from said second and third paths to produce a second combined signal having a comb type frequency spectrum with relative signal maximums interleaved between those of said one combined signal.

4. Apparatus according to claim 3, wherein:
   said filtering means further comprises means for separating said second combined signal into relatively low and high frequency portions; and
   said apparatus further comprising additional signal combining means for combining said low frequency portion of said second combined signal with said first combined signal.

5. Apparatus according to claim 4, wherein:
   said means for combining said low frequency portion of said second combined signal with said first combined signal includes a variable gain control for controlling the amplitude of said low frequency portion of said second combined signal.

6. Apparatus for processing television signals comprising:
means for supplying a television video signal including luminance and chrominance signal components;
clock signal generating means for supplying clock signals at a frequency proportional to a horizontal line scanning frequency associated with said television signal;
at least first, second and third signal processing paths, each having a signal input port coupled to said video signal supplying means and at least one delayed signal output port, said first and third paths including equal numbers of signal delaying stages and said second signal processing path having a greater number of signal delaying stages than said first and third paths, said third path including a signal inverter, said signal delaying stages of each of said paths being coupled to said clock signal generating means and being responsive to said clock signals for transferring signals representative of said video signal between each of said input and output ports, said first and second paths and said third and second paths providing a difference in time delay of said input signal which is inversely proportional to said clock signal frequency and is directly proportional to the difference in the number of stages between said first and third paths on the one hand and said second path on the other hand;
first signal combining means coupled to said delayed signal output ports of said first and second paths to produce a first combined signal including luminance components and having a comb type frequency spectrum with relative signal maximums at integral multiples of said line scanning frequency;
second signal combining means coupled to said delayed signal output ports of said second and third paths to produce a second combined signal having a comb type frequency spectrum with relative signal maximums at odd multiples of one-half said line scanning frequency;
filtering means coupled at least to said second signal combining means for separating said second combined signal into relatively low frequency vertical detail components and relatively higher frequency chrominance signal components; and
additional signal combining means for adding said vertical detail components to said luminance components.

7. Apparatus according to claim 6, wherein:
said additional signal combining means includes a variable gain control for controlling the amplitude of at least said vertical detail components.

8. Apparatus according to claim 6, wherein:
said signal delaying stages are of the charge coupled device type.

9. Apparatus according to claim 6, wherein:
said clock signal generating means comprises a color subcarrier oscillator and frequency multiplying means coupled to said oscillator for providing a reference signal at a frequency three times that of the color subcarrier output of said oscillator.

10. Apparatus according to claim 9, wherein:
said signal delaying stages are of the charge coupled device type, said first and third paths each including N delay stages and said second path including N + 682 1/2 stages.

11. Apparatus according to claim 10, wherein:
N is equal to unity.

12. Apparatus according to claim 10, wherein:
said additional signal combining means includes a variable gain control for controlling the amplitude of said vertical detail component added to said luminance component.

13. Apparatus according to claim 12, wherein:
at least one of said signal processing paths includes variable gain control means for adjusting the amplitude of signals in said path.

* * * * *